United States Patent [19]

Gött et al.

[11] 4,149,059
[45] Apr. 10, 1979

[54] ELECTRICAL MULTI-SPOT RESISTANCE WELDING MACHINE

[75] Inventors: Hans Gött; Josef Ritter; Klaus Ritter; Gerhard Ritter; Rudolf Scherr, all of Graz, Austria

[73] Assignee: EVG Entwicklungsu. Verwertungs-GmbH, Steiermark, Austria

[21] Appl. No.: 819,382

[22] Filed: Jul. 27, 1977

[30] Foreign Application Priority Data

Jul. 27, 1976 [AT] Austria .................................. 5516/76

[51] Int. Cl.² .................................................. B23K 11/10
[52] U.S. Cl. .................................... 219/56; 219/86.61; 219/87; 219/116
[58] Field of Search ................... 219/56, 58, 86.61, 87, 219/116

[56] References Cited

U.S. PATENT DOCUMENTS

| | | | |
|---|---|---|---|
| 1,189,584 | 7/1916 | Kicklighter | 219/87 |
| 2,269,091 | 1/1942 | Humphrey | 219/56 |
| 2,556,602 | 6/1951 | Schwartz | 219/86.61 X |
| 3,469,055 | 9/1969 | Gott | 219/56 |
| 3,588,417 | 6/1971 | Gott | 219/56 |
| 3,725,632 | 4/1973 | Ritter | 219/56 X |
| 3,731,042 | 5/1973 | Ritter | 219/56 |
| 3,936,628 | 2/1976 | Ritter | 219/56 |

FOREIGN PATENT DOCUMENTS 214747  4/1961  Austria ........................................ 219/56

*Primary Examiner*—Richard R. Kucia
*Attorney, Agent, or Firm*—Ernest F. Marmorek

[57] ABSTRACT

The invention relates to electrical multi-spot resistance welding machine for the production of welded bar gratings produced by welding cross-bars into the narrow side of parallel, upright flat bars. Such a machine has a pressure-beam which is guided vertically on a frame for lowering onto and raising away from the bars to be welded. Two rows of electrodes are disposed on the pressure beam, the rows being transverse to the feed path of the flat bars and the electrodes in the two rows being aligned in the feed direction of the flat bars and the electrodes of each aligned pair thus formed are connected to the secondary terminals of opposite polarity of a respective welding transformer. The electrodes are mounted in the pressure beam such that the electrodes of each pair aligned in the feed direction of the flat bars, are at least partially independently slidable vertically within the beam against a biasing force, the pressure beam and the welding transformers being mounted in a single unit for lowering and raising together. Short flexible supply leads connect the electrodes with the transformers.

10 Claims, 4 Drawing Figures

ELECTRICAL MULTI-SPOT RESISTANCE WELDING MACHINE

The invention relates to an electrical multispot resistance welding machine for the production of welded bar gratings by welding cross-bars into the narrow sides of parallel flat iron strips standing on edge in a horizontal welding zone, by the employment of a pressure-beam for generation of the welding pressure. The pressure-beam is guided vertically on the machine frame and can be lowered onto the work to be welded or respectively raised in the direction away from the work to be welded by a motor.

A double-spot welding method is used. Two rows of electrodes being provided transversely to the feed path of the flat bars in the welding zone and in each case two electrodes from the two rows, lying one behind the other in the direction of feed of the flat iron strips, are connected to the secondary terminals of opposite polarity of the same welding transformer and form a double-spot welding section.

Electrical multispot welding machines for the welding of bar gratings have, in general, a construction similar to the known grid welding machines for the production of welded grids for concrete reinforcement, or the like from longitudinal and cross-bars. The double-spot welding method already known with normal grid welding machines (see for example Austrian Patent Specification No. 267.293) is advantageously in the welding of bar gratings so that two cross-bars are welded simultaneously onto each longitudinal bar by two electrodes. These electrodes lie one behind the other in the direction of feed of the longitudinal bars, and through which the welding current flows in series in cooperation with a passive current-bridge arranged opposite the electrodes.

Independently of whether the grid welding is effected according to the single-spot method or according to the double-spot method the necessary welding pressure must be applied by a so-called pressure-beam. In the case of known grid welding machines for single-spot welding the electrode beam contains one of two cooperating rows of electrodes (see for example Austrian Patent Specification No. 214.747), whereas in known grid welding machines for double-spot welding the passive current-bridges are mounted on the movable electrode beam (see for example Austrian Patents Nos. 267.293, U.S. Pat. No. 3,497,659 and 298.204, U.S. Pat. No. 3,692,970).

If a pressure-beam is employed in a bar grating welding machine in a manner similar to the known grid welding machine and the double-spot welding method is applied, particular problems arise.

One problem follows from the situation that in the production of bar gratings the cross-bars must be welded into or "set down" into the flat bars up to their full thickness, whereas the depth of welding-in in the case of known grid welding machines is always only small and amounts only to a fraction of the diameter of the thinner bar. It follows from this depth requirement that both the stroke of the pressure-beam and also the welding pressure and the electric power necessary for the welding in the case of welding machines for the production of bar gratings must be considerably greater than in the case of the known grid welding machines.

The long stroke of the pressure-beam demands a correspondingly large crank radius of the cranks or eccentrics which usually generate the motion, which together with the large applied pressures follows the demand for very powerful motors which apply large torques.

Another problem follows from the requirement of high welding powers, which imply large dimensioned leads between the secondaries of the welding transformers and the welding electrodes. These leads have to be as short as possible but also must be flexible if the operation is to be carried out with electrodes movable relatively to the welding transformers. In the case of double-spot welding with stationary electrodes and movable passive current-bridges the requirement of flexible and relatively long current supply leads to the electrodes are avoided, as this calls for the application of movable passive current-bridges, especially since these can in known manner easily be supported in such a way that they distribute the pressure from the pressure-beam uniformly between the two weld spots (see for example Austrian Patent Specification No. 298.204).

The invention is concerned with the problems of bar grating welding machines of the species specified initially, in which a pressure-beam is thus employed in known manner and the double-spot welding method is applied. The total installed power must be kept as low as possible.

The installed power of the machine is composed of two components, that is, the power of the driving motors for generating the welding pressure and the actual welding power. The invention is based on the recognition that both components may be reduced by mounting the welding transformers on the pressure-beam.

According to the invention an electrical multispot resistance welding machine of the type of construction specified initially has the electrodes mounted in the pressure-beam such that the electrodes of each pair aligned in the feed direction of the flat bars, are at least partially independently slidable vertically within the beam against a biasing force. The pressure-beam and the welding transformers are mounted in a single unit for lowering and raising together; and short flexible supply leads connect the electrodes with the transformers.

By mounting the welding transformers on the pressure-beam its weight is increased many times over, whereby against expectations the torque to be applied by the driving motor of the machine is, however, reduced. That is, the driving motor now needs to apply at a maximum only a torque which corresponds with the desired applied pressure reduced by the increased beam-weight achieved. Of course, with the increased weight of the beam the torque necessary for raising the beam off the work to be welded increases, but that is not of any importance so long as the torque necessary for application of the pressure is still greater than that necessary for the raising as is usually so. The optimum beam-weight is reached in this connection when the beam and the components it carries is made so heavy that the crank torque necessary for pressing the beam down to produce the required welding pressure is equal to the crank torque necessary for raising the beam from the weldwork.

Because of the mounting of the welding transformers on the pressure beam, the two rows of electrodes fed from the transformers may be arranged on the pressure-beam so that very short supply leads for the welding currents result. Because the electrodes, which are part of the double-spot welding sections are slidable independently of one another and due to the support provided by the pressure-beam, the exercise of a welding pressure on both weld spots of the double-spot welding section at the start of welding is ensured. Further welding pressure during the pressure stroke of the pressure-beam is generated by the prestressing of the springs 5 which produce the biasing force and being largely maintained during the welding of the cross-bars into the flat iron strips or bars. The electrodes perform, with respect to the pressure beam, only small relative movements, so that short flexible sections in the supply leads for the welding currents to the electrodes are enough to take up these relative movements.

A particularly favourable form of a welding machine results if on both sides of the transverse rows of electrodes an at least approximately equal number of welding transformers is mounted on the pressure-beam.

In order to insure that in spite of the separate springy support of the two electrodes of each pair (forming a double-spot welding section) (which also in the event of tolerances on the diameter of the cross-bars ensures contact of both electrodes with the associated cross-bar at the start of the welding process and therefore the initiation of a flow of welding current), the cross-bars at the large welding-in depths necessary are welded completely into the narrow sides of all of the flat bars and come to lie in a common plane.

Preferably, an electrode pressure-bar is provided in the pressure beam which extends across the whole width of the machine and is supported in a manner to be able to slide relative to the pressure-beam in its direction of motion. The electrode pressure bar is loaded with respect to the pressure-beam by springs, in the direction of the motion of pressure of the electrodes and in a limiting position is supported by stops against the spring pressure. Along the electrode pressure-bar two rows of electrode carriers may be provided which are insulated from the pressure bar and from each other and, which are arranged one behind the other in the direction of feed of the flat iron strips. There electrode carriers are guided to be able to slide to a limited extent with respect to the electrode pressure bar, again in the direction of the motion of the beam.

The carriers are preferably spring loaded.

One example of a machine according to the invention will now be described with reference to the accompanying drawings, in which.

Figure 1:
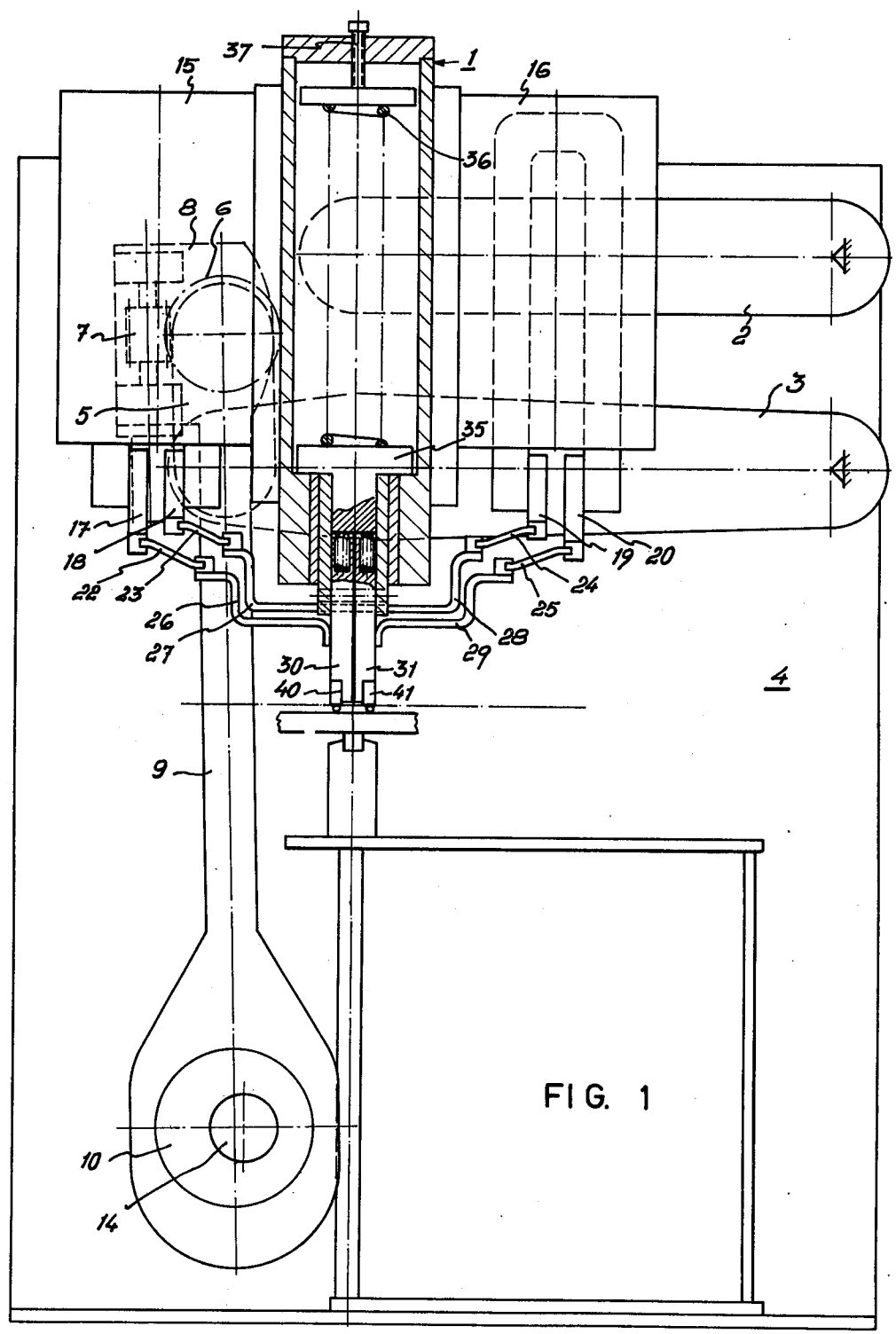
FIG. 1 is a side elevation of the machine with the sideplate removed and with a section through the pressure-beam.

As may be seen from FIG. 1 the pressure-beam designated generally as 1 is supported in sideplates 4 of the welding machine in each case by two single-arm levers 2 and 3. These two levers 2 and 3 are supported pivotally both in the machine sideplates 4 and also in the pressure-beam 1 and form, since the distance apart of the hingepoints is equal on both levers and the levers are parallel with one another, a parallel guide linkage for the pressure-beam 1.

The lever 3 is extended beyond its hingepoint onto the pressure-beam 1 and connected at its end to one end of a link 5. The other end of the link 5 is pivotally mounted on the widened end 8 of a connecting rod 9. A worm 7 is arranged on the widened end 8 of the connecting rod 9, so that it can rotate but cannot be displaced axially. The worm 7 engages with a wheel 6 fixed to the link 5 for rotation therewith.

With the machine stationary, rotation of the worm 7, which may be effected by motor or by hand, swivels the link 5 about its point of support in the widened end 8 of the connecting rod 9. It is thereby possible to raise the pressure-beam 1 and all the parts connected to it above the level which can be reached in the service state of the machine, in order, for example, to be able to replace the electrodes or carry out other repairs.

Through the other end of the connecting rod 9 passes an eccentric disc 10 which is mounted for rotation with a shaft 14 driven by a motor. Rotation of the shaft 14 is thereby converted into a rhythmic up and down motion of the pressure beam and the parts connected to it.

Transformers 15, 16 are mounted preferably on both sides of the pressure-beam and connected rigidly to it, their secondary windings feeding busbars 17, 18, 19, 20 which are connected via short flexible supply leads 22, 23, 24, 25 to rigid conductive straps 26, 27, 28, 29 which are connected conductively to the electrode carriers 30, 31.

Figure 2:
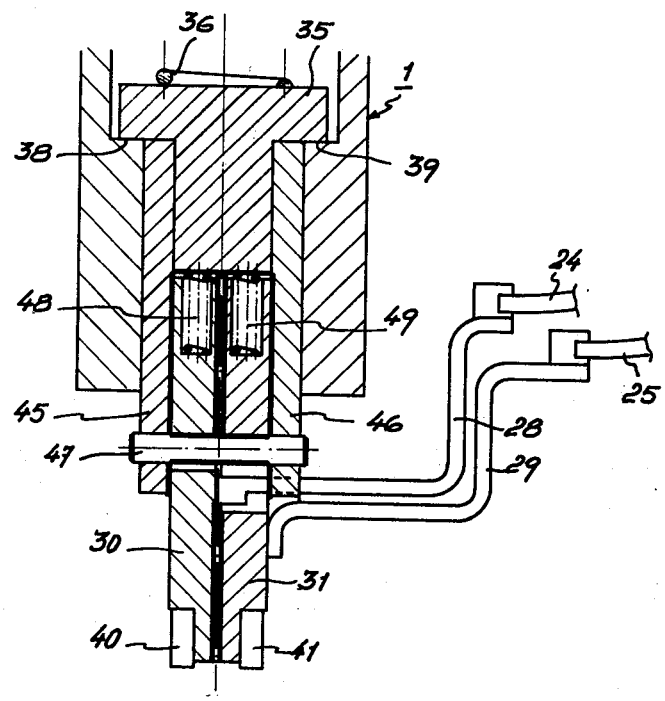
FIG. 2 is, on a larger scale, a section through the bottom region of the pressure-beam.

For the sake of clarity only the parts 24, 25, 28, 29 are shown in FIG. 2. Electrodes 40, 41, mounted on the carriers 30, 31, respectively form in pairs a double-spot welding section. The associated passive current-bridge may be formed by a metal rest for the flat iron strips standing on edge or by the flat iron strips themselves.

An electrode pressure-bar 35 is slidably guided inside the pressure-beam 1 which is of hollow construction. It is supported with respect to the pressure-beam by helical compression springs 36, the prestressing of which is adjustable by regulating screws 37. Stops 38, 39 formed as shoulders at the bottom end of the side parts of the pressure-beam 1 support the bar 35 at the bottom of the beam 1. Instead of the helical springs other suitable spring components could of course be provided. The electrode pressure-bar 35 which extends across the whole width of the machine and is loaded by all the springs 36 transmits the pressure of these springs to the electrode carriers 30, 31 and thereby to the electrodes 40, 41. This rigid bar ensures that all the electrodes remain in one line when the work to be welded becomes liquefied locally under the action of the welding current and the cross-bar under the action of the springs 36 penetrates into the flat iron strips. Hence one electrode, say cannot lead or lag behind the others and thus force the section of cross-bar loaded by it deeper or less deeply into the flat iron strip than the rest of the electrodes.

On the inside of the bottom regions of the two sidepieces of the pressure beam 1, which are formed as shoulders, filler plates 45, 46 are arranged, which at the bottom project beyond the two sidepieces and exhibit drilled holes in which pins 47 are inserted.

Figure 3:
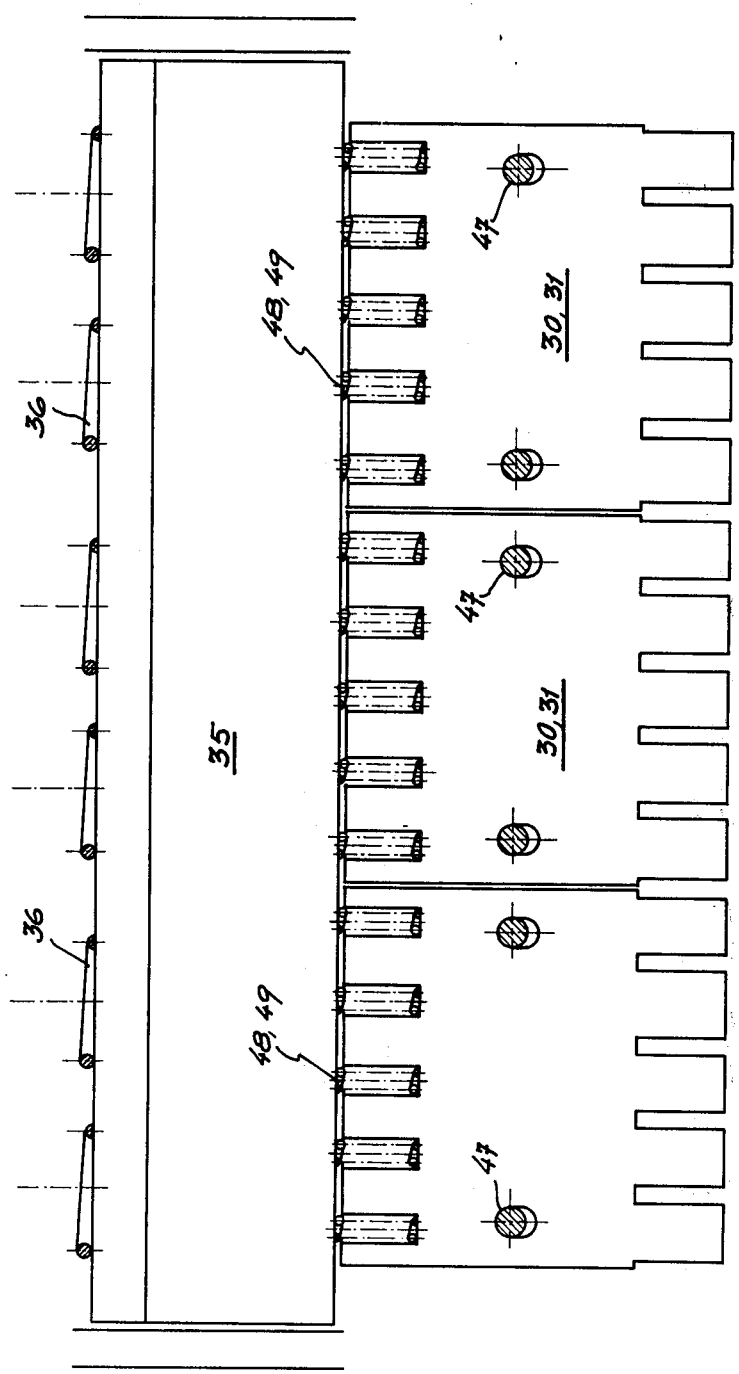
FIG. 3 is an elevation of the electrode pressure-bar and the electrode carriers; and, FIG. 4 is a graph of the stroke of the pressure-beam plotted against the angle of rotation of the pressure-crank.

The electrode carriers 30, 31 are guided slidably between the filler plates 45, 46. The electrode carriers are insulated from one another, from the filler plates, from the electrode pressure-bar and from the pins 47. This insulation is indicated only in FIG. 2 and by thick black lines. Theoretically for each electrode its own electrode carrier could be provided. But in practice it is to be recommended that a common electrode carrier be provided for a fairly large number of electrodes in each row of electrodes. Preferably each of the two lines of weld parallel with one another is subdivided into three substantially equally wide sections which can be connected each to one phase of a three-phase system with all of the electrodes of one such section arranged on a common electrode carrier. FIG. 3 shows three electrode carriers made in that way, from which for the sake of clarity the actual electrodes have been left out.

The electrode carriers 30, 31, receive in their tops helical springs 48, 49 which bear against the electrode pressure-bar 35. In the rest position there is a slight gap between the top faces of the electrode carrier 30, 31 and the bottom face of the electrode pressure-bar 35 and likewise the openings in the elongated carriers through which the pins 47 are passed in order to support the electrode carriers against the pressure of the spiral springs 48, 49 are formed as elongate holes in order to allow a slight springing in of the electrode carriers in the direction towards the electrode pressure-bar 35.

In that case it is essential that the springs 48, 49 are only so strong that they press the electrodes with adequate force against the cross-bars in order to avoid the formation of an arc to the thinner bar if the two cross-bars to be welded simultaneously do not because of the unavoidable tolerances on diameter, have exactly equal diameters. In any case the springs 48, 49 are weaker than the springs 36, so that the springs 48, 49 get compressed when the pressure-beam 1 is moved downward by the resistance of a cross-bar until the top faces of the electrode carriers 30, 31 rest against the bottom face of the electrode pressure-bar 35. The elongated holes through which the pins 47 pass are also of course made sufficiently long to enable such contact.

Figure 4:
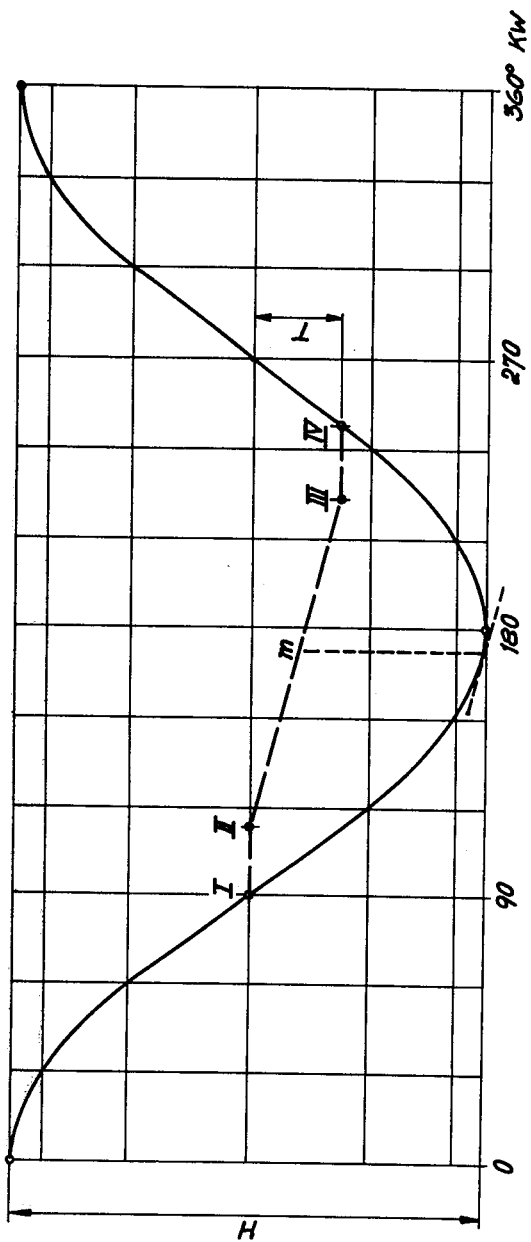

FIG. 4 shows the relationship between the angle of rotation KW of the crank and the stroke H of the pressure-beam. Starting from the top dead centre postion the crank passes through an angle of approximately 90° until the electrodes at the point 1 come into contact with the cross-bars. While the pressure-beam 1 travels on down, the electrodes are prevented from further movement by the cross-bars. The springs 36 are then stressed and also the springs 48, 49 (or in the case of unequally thick cross-bars at least the springs of the electrodes resting against the thicker cross-bar) until the electrode carriers 30, 31 in question come into contact with the electrode pressure-bar 35.

As soon as the crank has reached the angular position corresponding with the point II the welding current is switched on in known manner and the electrodes start to force the cross-bars into the material of the flat iron strips as it liquefies locally, whereupon the springs 36 become further stressed by the pressure-beam moving down faster than the electrodes.

At a crank angle of, for example, about 176°, corresponding with the point m the springs 36 have reached their maximum prestress and they start with increasing speed to relax because the electrodes press the cross-bars steadily further into the material which is becoming increasingly plastic, but the pressure-beam comes to a standstill in the vertical direction and at a crank angle of 180° is beginning to reversing its direction of motion.

At the point III the welding current is, in known manner, switched off. The cross-bars are now welded into the flat iron strips to the full depth T and the electrodes remain stationary as the beam rises.

At the point IV corresponding about with a crank angle of 270° the electrode pressure-bar is again resting against the stops 38, 39 from which it was raised at the point I, and the pressure-beam moving on upwards raises the electrodes from the weldwork.

We claim:

1. An electrical multi-spot resistance welding machine for the production of welded bar gratings produced by welding cross-bars with the aid of electrodes into the narrow sides of substantially parallel upright flat bars, comprising in combination:

a frame;

a pressure-beam guided on said frame for movements towards and away from the cross-bars to be welded;

a pressure-bar mounted within said pressure-beam and extending across at least a part of the width of the machine, said pressure-bar being slidable relative to said pressure-beam;

a first biasing means acting between said pressure-beam and said pressure-bar urging said pressure-bar towards said cross-bars;

a plurality of stops retaining said pressure-bar within said pressure-beam against the action of said first biasing means;

means defining a feed path for the flat bars;

two rows of electrodes arranged transverse to said feed path;

holding means disposed on said pressure-bar and adapted for holding said two rows of electrodes, said electrodes in said rows being adapted to be aligned in pairs in said feed direction by said holders;

a plurality of welding transformers mounted on said pressure-beam, operable to move together with said pressure-beam towards and away from said cross-bars, each transformer including a pair of terminals of opposite polarity;

said electrodes of each of said pairs being adapted to be connected to a respective transformer at said terminals of opposite polarity, and said electrodes of each of said pairs being adapted to be at least partially independently slidable within said pressure-bar towards and away from said cross-bars; and a second biasing means adapted to bias said electrodes towards said feed path.

2. A welding machine according to claim 1, further including a plurality of busbars, said busbars being mounted for movement with said beam and said transformers and being connected to said secondary windings of said transformers, said supply leads connecting said electrodes to said busbars.

3. A welding machine according to claim 1, further comprising a substantially equal number of welding transformers mounted on each side of said pressure-beam.

4. A machine according to claim 1, comprising electrode carriers arranged side by side in pairs to support said transverse rows of electrodes, said electrode carriers of each pair being slidable together relative to said electrode pressure-bar.

5. A welding machine according to claim 4, wherein said electrode carriers of each of said transverse row comprise three units, said units being insulated from one another and slidable together with respect to the pressure-bar.

6. A welding machine according to claim 1, wherein said first and second biasing means comprise springs.

7. A welding machine according to claim 6, wherein at least one of said springs is adjustable.

8. A welding machine according to claim 6, wherein the springs comprising the first biasing means have a greater stress-to-strain ratio than the springs comprising the second biasing means.

9. A welding machine according to claim 1, wherein the weight of the pressure-beam together with said transformers, said pressure-bar, and said holding means is so dimensioned that a crank torque needed to produce the required welding pressure is substantially equal to a crank torque necessary for raising the pressure-beam together with said transformers, said pressure-bar, and said holding means, after welding.

10. A welding machine according to claim 1, further comprising:
 a motor;
 a shaft rotatable by and secured to said motor;
 an eccentric disk mounted on said shaft for rotation therewith;
 a connecting rod hingeably connected near one end to said eccentric disk and near the other end in driving connection with said pressure-beam, whereby rotation of said shaft by said motor is converted into receiprocal motion of said pressure-beam.

* * * * *